July 10, 1956 W. J. GAUVREAU 2,754,370

TELEPHONE ATTACHMENT

Filed June 25, 1952

INVENTOR.
William J. Gauvreau
BY Walter W. Burns
Attorney

United States Patent Office 2,754,370

Patented July 10, 1956

2,754,370

TELEPHONE ATTACHMENT

William J. Gauvreau, Flushing, N. Y.

Application June 25, 1952, Serial No. 295,398

1 Claim. (Cl. 179—90)

This invention relates to telephone attachments and particularly to attachments for the dial of a dial telephone.

Under some conditions, due to the location of the telephone or to the physical condition of the user or users, the operation of the dial telephone is difficult. For example, the telephone may be located in a place where it is not properly illuminated or where at the time, lighting facilities are not available or where it is not desirable to turn on the light. Another example where the operation of the usual equipment of the dial telephone is difficult, is the case where the eyesight of the user or users may be so impaired that the operation of the ordinary equipment is either very difficult or even impossible. In such cases, mistakes in the use of the dial are liable to occur with resulting embarrassment to the user.

The primary object of this invention is the provision of an improved attachment for a dial of a dial telephone which will enable its use under unfavorable conditions.

Another object of the invention is the provision of an improved attachment for the dial of a dial telephone which will enable the user to use the dial of the telephone without actually seeing the details of the dial and its designations of letters and figures.

Another object of the invention is the provision of an improved attachment for the dial of a dial telephone which will have a construction enabling the user to safely rely on the sense of touch in dialing a call number, without actually seeing the letters and figures on the dial.

A further object of the invention is the provision of an improved attachment for the dial of a dial telephone wherein the spaces occupied by the several finger-spaces of the dial are covered by a larger area to provide for larger indicia.

A still further object of this invention is the provision of an attachment for a dial of a dial telephone having the finger-spaces of the dial covered and with extensions at the outer edge of the attachment to provide larger finger-spaces than those of the dial.

Another and still further object of the invention is the provision of an attachment for the dial of a dial telephone having raised or embossed letters of the usual or Braille type to enable dialing by the sense of touch rather than by the usual method using sight.

Another and further object of the invention is the provision of an attachment for the dial of a dial telephone having open finger-spaces at the outer periphery of the attachment which may be used without covering the indicia with the operating finger of the user.

Another and still further object of the invention is the provision of an attachment for the dial of a dial telephone which is held in place from accidental displacement by a press fit on the dial, thus enabling the user to readily remove the attachment if desired.

Another and further object of the invention is the provision of an attachment with engaging portions for registration with the finger-spaces of the dial to prevent accidental rotary movement of the attachment relative to the dial.

Other and further objects will be apparent to those skilled in the art from a reading of the complete specification.

Referring to the drawing where an embodiment of my invention is illustrated,

Similar reference characters refer to the same or similar parts throughout the specification and drawing.

Figures 1, 2, 3, 4:
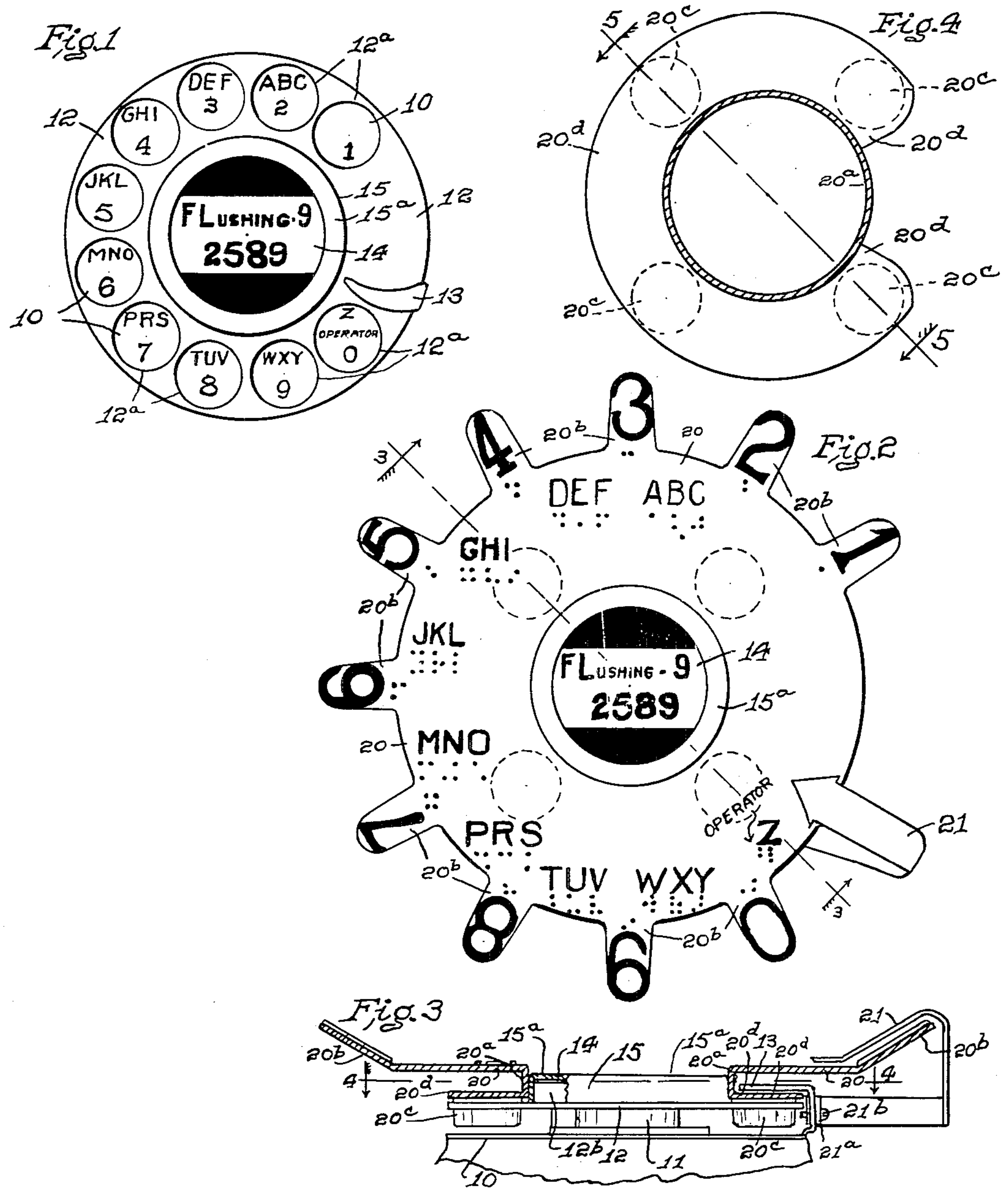
Fig. 1 is a face view of the dial of a dial-operated telephone, to which my invention is adapted to be attached.
Fig. 2 is a face view of my invention attached to the dial of a dial-telephone.
Fig. 3 is a sectional view on the line 3—3 of Fig. 2, with the dial only partly in section and with parts omitted for the sake of clearness of illustration.
Fig. 4 is a detail view of a portion of the flange which carries the finger-space engaging means for preventing relative rotation between the dial and the attachment.
Figure 5:
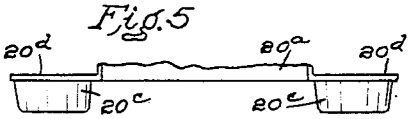
Fig. 5 is a cross-section on the line 5—5 of Fig. 4.

In Fig. 1 the indicia plate 10 is rigid with the body of the telephone set and is provided with a pivot 11 upon which is mounted the rotating dial 12. The rotating dial member is provided with finger-spaces or openings 12$^a$—10 in number. On the indicia plate 10, beneath each finger opening are the usual letters and figures for use when the dial is used in making a telephone call in the usual manner.

A finger-stop 13 is rigidly mounted with relation to the body of the telephone set and the indicia plate and extends across the path of the openings 12$^a$, to intercept the finger of the user when dialing.

Mounted on the pivot 11 and rotating with the dial 12 is a drum 12$^b$ which carries at its outer surface the card 14 which carries the call number of the telephone, such as FLushing 9-2589, as illustrated. In order to hold the card 14 in place, there is provided a snap-on ring member 15 which has an inner cylindrical surface which has a snug fit with the outer surface of the upper portion of the drum 12$^b$. Overlapping the outer edge of the card 14 is a flange 15$^a$ of the ring member 15. The foregoing description is applicable to the usual construction of the dial telephone in common use and is not a part of this invention per se.

The construction of my invention as applied to the dial telephone set, described above, will now be set forth.

The main body of my invention has been designated 20 and is generally the shape of a flat plate. At the center is located an opening with a turned-in flange 20$^a$ as shown in Fig. 3. The inside of the flange 20$^a$ is of a size to fit snugly on the outside of the ring member 15 already described. By this construction, the call number of the telephone is still clearly visible when my invention is in place on the dial.

Outwardly of the upper edge of the flange 20$^a$ is a portion of the body portion 20 which is sufficiently large to provide spaces for the letters designating the call of the telephone. This space is larger than the corresponding space beneath the rotatable dial and on the indicia plate. The indicia which I use to indicate the letters and figures, I term as being enlarged indicia for the reason that the individual letters and figures which I use are larger than those used on the standard equipment now in use on telephone sets of the dial type. Their positions do, however correspond with the respective indicia of the indicia plate except that the figures are placed in a slightly different position as will be described.

The indicia for the letters and figures are preferably of the raised type which enables the user to distinguish, by touch if necessary, the letters and figures, or distinguish them by sight under relatively dim lighting conditions.

Outwardly of the circle within which the letters and figures are located, I provide projections 20$^b$ in positions corresponding to the radial lines between the openings 12$^a$ of the dial 12. These projections 20$^b$ are of sufficient length to provide spaces therebetween to permit entry of the finger of the user when dialing a number. These spaces correspond to the openings $12^a$ of the dial 12 and are in corresponding radial positions. In the illustrated embodiment, these projections $20^b$ carry the figures indicating the numerals of the call number.

In position over the finger-stop 13 and secured to this stop 13, I provide a larger finger-stop 21 which is necessary due to the fact that the finger-stop 13 is covered when my invention is in place. It is also necessary because the projections $20^b$ extend outwardly farther than the finger-stop 13.

The finger-stop 21 is preferably provided with an integral clamp or clip $21^a$ which has portions on opposite sides of the finger-stop 13 below the level of the dial 12, as shown in Fig. 3. A screw $21^b$ may be provided to hold the clamp or clip $21^a$ rigid with the finger-stop 13.

In order to counteract any tendency for the body member 20 to rotate on the dial 13, I have provided coacting means to rotate the dial when the body member 20 is rotated as in dialing. In the illustrated embodiment, a flange member $20^d$ is provided and extends outwardly from the bottom of the inwardly extending flange $20^a$. On the underside of this flange $20^d$, are registration members which are preferably made of rubber or some resilient material. These members $20^c$ may be made of a slightly conical shape so that they may be given a snug fit in the openings $12^a$ of the dial 12. In the embodiment illustrated, there are four such registration members $20^c$ which I have spaced so that they will register with the openings "1," "4," "7" and "0" of the dial 12.

In order to have the flange $20^d$ clear the finger-stop 13 during installation of my invention, I have cut away a portion of the flange $20^d$ between the registration members which register with the openings "1" and "0." In installing, the inwardly extending flange $20^a$ is thin enough to pass the inward point of the finger-stop 13 and since the flange $20^d$ is cut away adjacent the finger-stop 13, my invention may be readily slipped into its place on the dial 12. When in place, the snug fit of the flange $20^a$ on the ring member 15 and the snug fitting of the registration members $20^c$ in the openings $12^a$ of the dial 12, will hold my invention in proper relation for dialing.

When used to make calls, the dialing operation is quite similar to the ordinary use of the dial of the phone set, except that the dialing contact is made with the finger between the extensions $20^b$. It is to be noted that with the dialing finger of the user between the projections $20^b$, the letters are in full view of the user.

In addition to the enlarged letters and figures, it will be noted that I have illustrated both letters and figures in Braille dots, the Braille characters being adjacent the enlarged block letters and figures. This construction enables the blind to use the ordinary dial telephone when my invention is attached thereto.

While I have illustrated and described in detail an embodiment of my invention, it is to be understood that the disclosure is merely illustrative and that modifications and changes may be made without departing from the spirit of the invention and within its scope as claimed.

Having described my invention, what I claim is:

An attachment for the dial of an ordinary dial telephone comprising a body member, the body member having a recess of a size and shape to receive and register with the central portion of the dial, securing devices for holding the body member on the dial to turn therewith, projections corresponding to the radial lines between the finger openings of the dial, the projections extending outwardly beyond the outer periphery of the dial, the adjacent fingers forming finger spaces therebetween, outwardly of the periphery of the dial.

References Cited in the file of this patent

UNITED STATES PATENTS

| | | |
|---|---|---|
| 1,538,354 | Richter | May 19, 1925 |
| 1,723,297 | Norton | Aug. 6, 1929 |
| 1,765,428 | Hurford | June 24, 1930 |
| 2,244,609 | Cosgrove | June 3, 1941 |

FOREIGN PATENTS

| | | |
|---|---|---|
| 595,407 | Germany | Apr. 12, 1934 |
| 834,633 | France | Nov. 25, 1938 |